United States Patent
Rosemeier et al.

(10) Patent No.: US 12,000,370 B2
(45) Date of Patent: Jun. 4, 2024

(54) ROTOR BLADE EXTENSION

(71) Applicant: FRAUNHOFER-GESELLSCHAFT ZUR FÖRDERUNG DER ANGEWANDTEN FORSCHUNG E.V., Munich (DE)

(72) Inventors: Malo Rosemeier, Bremen (DE); Moritz Bätge, Bremen (DE); Matthias Lindermann, Worpswede (DE)

(73) Assignee: FRAUNHOFER-GESELLSCHAFT ZUR FÖRDERUNG DER ANGEWANDTEN FORSCHUNG E.V., Gummersbach (DE)

( * ) Notice: Subject to any disclaimer, the term of this patent is extended or adjusted under 35 U.S.C. 154(b) by 278 days.

(21) Appl. No.: 17/287,596

(22) PCT Filed: Oct. 22, 2019

(86) PCT No.: PCT/EP2019/078756
§ 371 (c)(1),
(2) Date: Apr. 22, 2021

(87) PCT Pub. No.: WO2020/083930
PCT Pub. Date: Apr. 30, 2020

(65) Prior Publication Data
US 2021/0317815 A1    Oct. 14, 2021

(30) Foreign Application Priority Data
Oct. 22, 2018  (DE) ............... 10 2018 218 067.9

(51) Int. Cl.
*F03D 1/06*    (2006.01)
(52) U.S. Cl.
CPC ......... *F03D 1/0675* (2013.01); *F03D 1/0687* (2023.08); *F05B 2230/601* (2013.01);
(Continued)

(58) Field of Classification Search
CPC ........ F03D 80/50; F03D 1/065; F03D 1/0675; F03D 1/0683; F05B 2230/80; F05B 2240/307
See application file for complete search history.

(56) References Cited

U.S. PATENT DOCUMENTS 8,360,733 B2 * 1/2013 Bell ................... F03D 1/0675
416/233
9,494,135 B2 * 11/2016 Kirkegaard ........... F03D 1/0675
(Continued)

FOREIGN PATENT DOCUMENTS

| CN | 206513503 U | * | 9/2017 |
| DE | 102008054323 A1 | | 5/2010 |

(Continued)

OTHER PUBLICATIONS

English translation of CN206513503U (Year: 2017).*
(Continued)

*Primary Examiner* — J. Todd Newton
*Assistant Examiner* — Wesley Le Fisher
(74) *Attorney, Agent, or Firm* — Marshall & Melhorn, LLC

(57) ABSTRACT

A wind turbine rotor blade extension fitting element, which extension fitting element is designed as a rotor blade rib with a recess and which can be pushed onto the rotor blade tip of a rotor blade to be extended, in such a way that the rotor blade tip protrudes through the recess and contacts the circumferential surface of the recess in an positive-locking manner. The extension fitting element has, on its outer circumference, an outer circumferential surface onto which a shell-like rotor blade extension can be pushed in an positive-locking manner. A core of the extension fitting element has slits and/or boreholes which, for stabilization, are filled with a material that has a higher strength and/or stiffness than the material of the core. In this way, the (Continued)

extension fitting element is strengthened for the transfer of high loads.

17 Claims, 4 Drawing Sheets

(52) U.S. Cl.
CPC ....... *F05B 2230/80* (2013.01); *F05B 2230/90* (2013.01); *F05B 2240/307* (2020.08)

(56) References Cited

U.S. PATENT DOCUMENTS

| | | | |
|---|---|---|---|
| 9,617,973 B2 | 4/2017 | Stege | |
| 9,869,296 B2* | 1/2018 | Tobin | F03D 1/0675 |
| 9,944,024 B2* | 4/2018 | Hedges | B29C 70/38 |
| 10,927,809 B2 | 2/2021 | Barton et al. | |
| 11,499,523 B2* | 11/2022 | Larsen | B23P 15/02 |
| 2012/0121430 A1 | 5/2012 | Olsen et al. | |
| 2012/0141283 A1* | 6/2012 | Bell | F03D 1/0675 |
| | | | 29/889.7 |
| 2012/0196079 A1* | 8/2012 | Brauers | B32B 3/04 |
| | | | 428/116 |
| 2012/0230830 A1* | 9/2012 | Lind | B32B 27/12 |
| | | | 416/223 R |
| 2014/0140854 A1* | 5/2014 | Kirkegaard | F03D 80/00 |
| | | | 416/229 R |
| 2016/0354984 A1* | 12/2016 | Hedges | F03D 1/0675 |
| 2020/0095983 A1* | 3/2020 | Girschig | F03D 80/30 |
| 2021/0088025 A1* | 3/2021 | Larsen | B33Y 80/00 |

FOREIGN PATENT DOCUMENTS

| | | | | |
|---|---|---|---|---|
| DE | 102015010453 A1 * | 2/2017 | ............ | B29C 41/04 |
| EP | 2444657 A1 | 4/2012 | | |
| EP | 2749765 A1 | 7/2014 | | |
| WO | WO/2018050192 A1 | 3/2018 | | |
| WO | WO/2018050194 A1 | 3/2018 | | |

OTHER PUBLICATIONS

English translation of DE102015010453A1 (Year: 2017).*
European Patent Office, International Search Report with Written Opinion, issued in PCT/EP2019/078756, Jan. 20, 2020, 11 pages, European Patent Office, Rijswijk, Netherlands.

* cited by examiner

ROTOR BLADE EXTENSION

FIELD

The invention lies in the field of mechanical engineering and can be used particularly advantageously in the field of wind energy technology. It relates fundamentally to the retrofitted extension of rotor blades for wind turbines.

BACKGROUND

Rotor blades for wind turbines are usually calculated and designed prior to their production such that, when known materials are used, having parameters which are likewise known, said rotor blades withstand the occurring mechanical and environmental stresses, at least for the anticipated service life. When making such calculations, safety margins also have to be included, which take into account various parameters which are unknown or difficult to estimate or problems regarding the estimation of material properties or aging properties.

If the knowledge of material properties or aging properties is improved, or once weather data have been incorporated as a result of better wind speed predictions, it is often possible to improve the simulations for the calculation of stresses on wind turbines. It is thus often possible to better utilize the loading capacity of wind turbines by providing rotor blade extensions. Mechanical stresses that act on the rotor blades hereby increase in part; however, this is compensated for either by actually lower wind speeds or by an altered operating behavior, or it must be ensured that the parts of the wind turbine are able to be exposed to actually higher stresses.

It is already known to attach rotor blade extensions to the tips of existing rotor blades of a wind turbine. To this end, DE 10 2008 054 323 A1 discloses a construction for a blade tip extension. In that case, the blade tip extension is on the one hand adhesively bonded to the surface of the original rotor blade and on the other hand is stabilized by a narrow rib, which is incorporated into the blade tip extension and which is penetrated by the tip of the original rotor blade.

SUMMARY

Against the background of the prior art, the object of the present invention is to design the extension of a rotor blade of a wind turbine in such a way that improved mechanical strength and durability are achieved.

The object is achieved with the features of the invention by an extension fitting element according to the claims. The invention also relates to an extended rotor blade for a wind turbine.

Accordingly, the invention relates to an extension fitting element for a rotor blade of a wind turbine, which extension fitting element is designed as a rotor blade rib with a recess and which can be pushed onto the rotor blade tip of a rotor blade to be extended, in such a way that the rotor blade tip protrudes through the recess and contacts the circumferential surface of the recess in an positive-locking manner, wherein the extension fitting element has, on its outer circumference, an outer circumferential surface onto which a shell-like rotor blade extension can be pushed in an positive-locking manner, wherein the extension fitting element has a core made of a lightweight construction material, in particular a foam, in particular PU foam, PVC foam, or balsa wood, and has, on its outer circumferential surface and/or on its inner circumferential surface, a coating made of a layered composite material, in particular a fiber-reinforced layered composite material, and wherein the core of the extension fitting element has recesses, in particular slits and/or boreholes, which are filled with a material that has a higher strength and/or stiffness than the material of the core.

The circumferential surface of the recess for the rotor blade tip corresponds here to the inner circumferential surface of the extension fitting element.

The positive-locking adaptation of the inner circumferential surface of the extension fitting element to the outer contour of the original rotor blade and also the corresponding shaping at the outer circumference of the extension fitting element to push on the rotor blade extension in an positive-locking manner shall be understood to mean an adaptation in shape which allows the extension fitting element to be adhesively bonded flat to the original rotor blade and also to the rotor blade extension or to be connected by way of another joining technique, such as infusion, as known for example from WO 2018/050 194 A1.

The extension fitting element may also have, for example, ridges or recesses on its outer circumference, wherein the outer contour of the ridges corresponds to the inner contour of the rotor blade tip that is to be fitted on. Cavities are then created between the extension fitting element and the rotor blade extension to be fitted and may be filled with a liquid adhesive once the rotor blade extension has been pushed on. The ridges on the extension fitting element may extend, for example, parallel to the Z-axis of the rotor blade and may consist of a material against which the rotor blade extension slides with little friction, for example PTE or PTFE. The cavities between the ridges may be filled with adhesive, for example through boreholes which penetrate a half-shell of the rotor blade extension. The boreholes may then be sealed.

In this context, the core shall be understood to mean the substantial volume of the extension fitting element between its inner circumferential surface and its outer circumferential surface, with the exception of the coatings. The material thickness of the extension fitting element along its outer and/or inner circumferential surface may be variable in accordance with the requirements of the design.

This requires particular production methods, since conventional production methods are designed primarily for bodies with a constant layer thickness.

The coating of the extension fitting element with a layered composite material may consist, for example, of a matrix, in particular a resin, wherein the resin may be fiber-reinforced in particular. The fiber reinforcement may be uniaxial, biaxial or triaxial with different laid scrim layers. It is expedient to produce a secure bond between the lightweight construction material and the coatings so that loads may be transferred positive-lockingly.

The reinforcement regions formed by the slits/boreholes infused for example using the vacuum assisted resin transfer molding (VARTM) method, in particular if said reinforcement regions are arranged in the region between the main flanges of the rotor blade, increase the stability in respect of stresses in the impact direction, and the stability in the pivot direction is increased in the region of the front and rear profile edge of the rotor blade.

For example, it may therefore be provided that the recesses, in the form of slits and/or boreholes, in particular in the region of the extension fitting element which lies between the flanges of the rotor blade in the event of use on a rotor blade to be extended, extend with their slit planes and/or longitudinal borehole axes transversely, in particular perpendicularly to the chord of the extension fitting element.

The slits and/or boreholes may be filled here with a material that is also used as a matrix of the coating material for the coating of the extension fitting element, however, a material different from this may be used to fill the slits and boreholes.

The infusion material in the recesses/slits and/or boreholes may advantageously be rigidly connected, for example adhesively bonded, to the coating of the extension fitting element, or may be produced in one piece therewith and cohesively.

The slits may be arranged in the lightweight construction material for example in such a way that they extend from the inner and from the outer circumferential surface of the extension fitting element in each case perpendicularly to these surfaces and perpendicularly to the pivot direction of the rotor blade. For example, it may also be provided that, if boreholes are provided, they extend in some sections from the inner circumferential surface of the extension fitting element to the outer circumferential surface. It may be provided that the slits which extend from the inner circumferential surface of the extension fitting element into the lightweight construction material are arranged equidistantly from one another and that the slits which extend from the outer circumferential surface of the extension fitting element into the interior of the lightweight construction material are likewise distributed equidistantly from one another, wherein the first group of slits, which extends from the inner circumferential surface of the extension fitting element, is offset by half the distance between the slits in relation to the second group of slits, which extends from the outer circumferential surface into the interior of the extension fitting element. In the front and rear profile edge region of the extension fitting element, the slits may likewise extend perpendicularly from the outer and/or the inner circumferential surface into the lightweight construction material.

The lightweight construction material of the extension fitting element may also be inhomogeneous in respect of its density and may be denser on its outer side than internally in order to prevent adhesive from penetrating too deeply. The pores of the material may also be closed in the case of a foam material on the outer side.

It may additionally be provided advantageously that the expansion (D) of the extension fitting element in the direction (z) of the longitudinal axis of the rotor blade is at least 20% of the greatest expansion (E) of the extension fitting element in the pivot direction (t-direction) of the rotor blade.

According to the prior art, a rotor blade extension is secured to an original rotor blade substantially at two points along the rotor blade longitudinal axis, specifically on the one hand where the pushed-on rotor blade extension is in contact with and adhesively bonded to the surface of the original rotor blade, and furthermore at the point where the original rotor blade penetrates a rib inside the rotor blade extension. Forces and bending moments of the rotor blade extension are in this way transferred to the original rotor blade.

The invention makes it possible to create an improved connection between the rotor blade extension and the original rotor blade since a substantial portion of the forces from the rotor blade extension is transferred directly to the original rotor blade with the aid of an extension fitting element according to the invention. In addition, the end of the rotor blade extension close to the rotor shaft may be adhesively bonded to the surface of the rotor blade.

Due to the stated minimum length of the extension fitting element in the direction of the rotor blade longitudinal axis, this extension fitting element, by means of which both the original rotor blade, in particular its rotor blade tip, and the rotor blade extension are positive-lockingly connected, may transfer larger torsional, pivoting or impact moments without difficulty. In addition, a large contact area results between the extension fitting element on the one hand and the rotor blade extension on the other hand and also the original rotor blade to be extended, wherein these contact areas may each be used to reliably adhesively bond the various elements to one another. A very reliable and powerful connection between the original rotor blade, the extension fitting element, and the rotor blade extension may be created as a result.

The extension fitting element has substantially the form of a rotor blade rib, wherein an opening for pushing in the tip of the original rotor blade is provided, so that the extension fitting element has an outer and an inner circumferential surface. The inner circumferential surface is pushed onto the original rotor blade, whilst the rotor blade extension is pushed onto the outer circumferential surface of the extension fitting element. The extension fitting element additionally has two side faces, which for example may each extend in a planar manner and parallel to one another. The width of the extension element in the direction z between the two side faces may advantageously be at least 25% or at least 30% of its greatest expansion in the pivot direction of the rotor blade. Should the two side faces of the extension fitting element not extend parallel to one another, the width of the extension fitting element is understood to mean the distance between the two side faces in the z-direction at the narrowest point.

In one embodiment, it may additionally be provided that the core has boreholes, the borehole longitudinal axes of which extend substantially perpendicularly or at an angle between 90 and 45 degrees to the outer circumferential surface of the extension fitting element in a plane perpendicular to the chord of the extension fitting element and which are filled with a material that has a higher strength and/or stiffness than the material of the core. In this case too, as additionally also in the rest of the cases discussed further below, the filler material for the slits or boreholes may be identical to the matrix of the coating material of the extension fitting element or different therefrom.

A plurality of boreholes of which the borehole longitudinal axes extend in a plane perpendicular to the profile longitudinal axis (chord) of the extension fitting element and which each enclose an angle of between 30 and 150 degrees, in particular 70 to 110 degrees, more particularly 90 degrees to one another and are filled with a material that has a greater strength and/or stiffness than the material of the core may also be provided. The individual boreholes thus extend within the planes which would be defined by the slits, if slits according to the above explanations were to be provided. By providing boreholes, the volume of the recesses to be filled in the lightweight construction material is reduced, wherein an optimal increase in strength is achieved by the orientation and positioning of the boreholes.

Generally, it may be provided that the recesses, in particular slits and boreholes, in the extension fitting element are positioned in such a way that, once the extension fitting element and the rotor blade extension have been installed, at least some of the recesses, in particular slits and/or boreholes, are arranged in the region of the load-bearing regions of the profile of the rotor blade to be extended, in particular between the flanges of the rotor blade to be extended. This does not rule out providing additional slits and/or boreholes in the front and/or rear profile edge region of the extension fitting element.

A further embodiment of the extension fitting element may provide that at least some of the recesses, in particular slits and/or boreholes, are arranged in the load-bearing regions of the extension fitting element and in each instance extend as far as the coating on the outer or inner circumferential surface of the extension fitting element.

In addition to an extension fitting element of the above-explained kind, the invention also relates to an extended rotor blade for a wind turbine with an original rotor blade and an extension fitting element of the above-described kind pushed onto the original rotor blade and also with a rotor blade extension pushed onto the extension fitting element.

Furthermore, the invention also relates to an extended rotor blade for a wind turbine with an original rotor blade and an extension fitting element of the above-described kind pushed onto the original rotor blade, wherein the extension fitting element is connected to a rotor blade extension in such a way that the extension fitting element forms an integrated part of the rotor blade extension.

A rotor blade extension may typically consist of two interconnected half-shells, wherein the half-shells may be constructed in a single layer or multiple layers. In the case of a single-layered construction, an extension fitting element may be secured directly to one half-shell or to both half-shells.

The rotor blade extension, in the assembled state, may extend precisely in the longitudinal direction of the rotor blade or may be curved towards the pressure side in the impact direction in order to compensate for a deformation of the rotor blade during operation. The rotor blade extension may also have a winglet which extends from the rotor blade in the impact direction.

If the rotor blade extension, for each of its half-shells, has a layered construction which comprises an outer coating and also a lightweight construction material and an inner coating, the inner coating of one or both half-shells may thus in each instance be directly connected to the outer coating of the extension fitting element or may form the outer coating of the extension fitting element. In this way, the combination of the extension fitting element and the rotor blade extension may be produced in the factory as a single component and may be pushed as a whole onto an original rotor blade.

Therefore, the invention may also relate to an extended rotor blade for a wind turbine with a rotor blade to be extended and an extension fitting element pushed onto said rotor blade, wherein the extension fitting element is connected to a rotor blade extension in such a way that a coating of a layered composite material on the outer circumferential surface of the extension fitting element forms a layer of the rotor blade extension.

The invention additionally relates to a method for producing an extension fitting element for a rotor blade of a wind turbine, which extension fitting element is formed as a rotor blade rib with a recess and which can be pushed onto the rotor blade tip of a rotor blade to be extended, in such a way that the rotor blade tip protrudes through the recess and contacts the circumferential surface of the recess in an positive-locking manner, wherein the extension fitting element has, on its outer circumference, an outer circumferential surface onto which a shell-like rotor blade extension can be pushed in an positive-locking manner, characterized in that the core of the extension fitting element is firstly formed from a lightweight construction material, and in that then, starting from an inner and/or outer circumferential surface of the core, either slits or boreholes are formed in the core, wherein the slit planes extend transversely, in particular perpendicularly, to the chord of the extension fitting element or the borehole longitudinal axes extend in the direction of the slit planes thus defined, and in that the core is coated with a fiber-reinforced layered composite material comprising a composite of matrix material and reinforcement fibers, wherein the slits or boreholes are filled with an infusion material, in particular with the matrix material. In particular, it may be provided here that the slits/boreholes, in an individual step or jointly with the reinforcement fibers of the coating, are infused using the vacuum assisted resin transfer molding (VARTM) method with an infusion material, in particular the matrix material.

The production of the extension fitting element allows a good and powerful positive-locking load uptake and transfer due to the reinforced regions in the slits/boreholes of the lightweight construction material. This is successful in particular if the intrusion material in the slits/boreholes is rigidly connected to the matrix material of the coatings of the extension fitting element. This may then be achieved in particular if the slits/boreholes are infused jointly with the coating, for example in the VARTM method.

For example, it may be provided that the core of the extension fitting element is formed either from a block of a lightweight construction material, in particular a foam, more particularly a PVC foam, by material removal or by foaming into a mold or by an additive production method. In the case of these production methods there is sufficient design freedom for the outer form of the extension fitting element and also for the form, position and orientation of the recesses in the form of slits and/or boreholes. If, with regard to the processing, removing methods are selected, slits/boreholes as well as the recess and outer contour of the extension fitting element may thus be removed using a saw, milling machine, ultrasonic cutter, or hot wire.

In addition, it may be provided in the method that the core of the extension fitting element is formed by an additive production method, wherein the slits and/or boreholes are hollowed out directly during the additive production method or are produced directly by replacing the application head with another material. The particular advantages of additive production methods may thus be utilized particularly well, since the production process is shortened and material waste is minimized. Due to the combination of the additive production methods and use of different materials for the core and the filling of slits/boreholes in a method of this kind, the production may be made even more efficient on the whole, and a casting/infusion step may be avoided or made simpler and limited to just one outer coating.

In a method of this kind it may additionally be provided that the additive application strategy is realized along curved paths for fiber-reinforced materials in six axes.

The production method for the core of the extension fitting element may result from a combination of subtractive manufacturing methods, such as milling, sawing, drilling, and additive methods, such as 3D printing or fiber printing or tape laying, and is thus understood to be a hybrid production method.

Furthermore, other manufacturing methods, such as lasering, ultrasonic cutting, or processing with a hot wire, are also conceivable for creating the slits and boreholes.

In particular, among the additive manufacturing methods, 3D printing of expanding foam materials represents a technical innovation, as does also the possible combination with a further additive method for producing or filling the slits as stiffening elements of the foam core. As already mentioned above, resin or matrix may be used as material for the stiffening elements and are applied additively by means of a print head. However, it is furthermore also possible to mix glass fibers or carbon fibers of different length with the resin in order to thus significantly improve the mechanical properties of the material and thus also the produced component, in this case the extension fitting element.

With regard to the technical realization of the extension fitting element, the invention likewise relates to the manufacturing process via a gantry robot in 6 axes. The 6 axes are in particular necessary for the filling of the slits in an additive method along a curved path, for example of the aerodynamic profile of the outer or inner surfaces of the extension fitting element and represent a technical innovation for an additive application strategy.

BRIEF DESCRIPTION OF THE DRAWINGS

The invention will be shown and described hereafter based on figures of a drawing. In the drawing.

DETAILED DESCRIPTION

Figure 1:
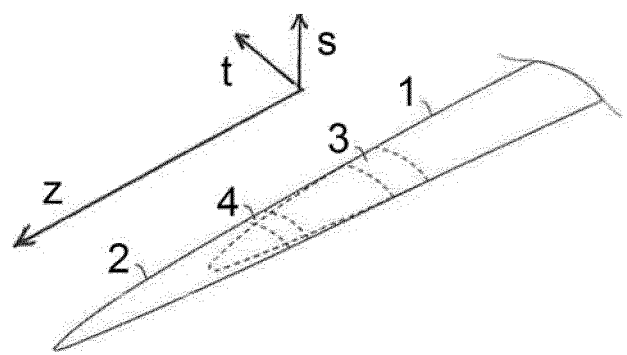
FIG. 1 shows a perspective view of an extended rotor blade with the used coordinate system.

FIG. 1 shows, in a perspective illustration, an extended rotor blade which has an original rotor blade 1 to be extended and also a rotor blade extension 2 and an extension fitting element 4. The extension fitting element is pushed onto the original rotor blade 1 to be extended and has the form of a rib, which surrounds the original rotor blade 1. The rib 4 extends around the front and the rear profile edge of the original rotor blade 1 and receives the original rotor blade in a recess.

The rotor blade extension 2, which for example is joined together from two half-shells and constructionally may have a form similar to that of a conventional blade, is pushed onto the tip of the original rotor blade 1 and the extension fitting element 4. The rotor blade extension 2 may be adhesively bonded to the extension fitting element 4 on the outer circumferential surface of said element. The rotor blade extension 2 protrudes beyond the extension fitting element 4 in the direction of the rotation axis of the wind turbine and is rigidly connected in the region 3 (adhesive bonding region) to the original rotor blade 1, for example by a glued joint. The extension fitting element 4 may be connected to the original rotor blade 1 to be extended at the inner circumferential surface of the extension fitting element 4 likewise by adhesive bonding.

For further orientation, a coordinate system with reference to the rotor blade in FIG. 1 is also shown for the other figures. The z-axis in this case points in the direction of the longitudinal axis of the rotor blade; the t-axis in the pivot direction, i.e. within the rotation plane of the rotor blades, and the s-axis in the impact direction, i.e. perpendicularly to z and t.

Figure 2:
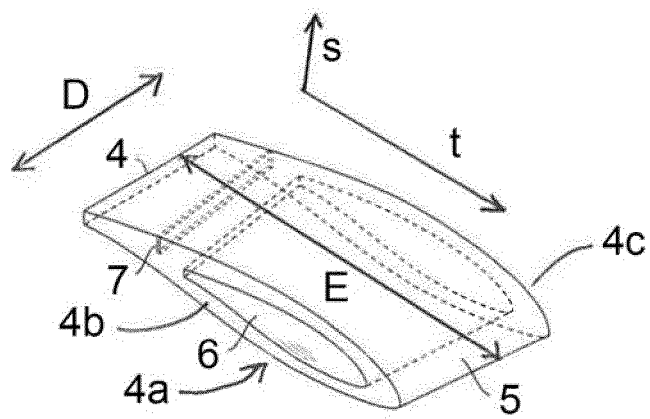
FIG. 2 shows a perspective view of an extension fitting element.

An extension fitting element 4 is shown in FIG. 2 in a perspective view. It may have the form of an aerodynamic profile with an outer circumferential surface 5. The extension fitting element 4 may consist primarily of a lightweight construction material, such as balsa wood or a foam. The extension fitting element 4 has a recess 4a in the form of a through-opening, which is formed such that it positive-lockingly receives a region of the original rotor blade 1 to be extended. The recess 4a is surrounded by the inner circumferential surface 6 of the extension fitting element 4. In FIG. 2, a slit 7 is additionally shown by way of example, which penetrates the lightweight construction material of the extension fitting element and which is infused with a solidified infusion material for stabilization. The slit 7 is shown merely by way of example for the provided recesses in the lightweight construction material, and it is explained further below how a plurality of slits or other forms of recesses may be distributed on the extension fitting element in order to achieve an increased mechanical stability.

The extension fitting element has two side faces 4b, 4c, which for example may be planar and which for example may also extend parallel to one another. The side faces may, however, also enclose an acute angle with one another.

The expansion D of the extension fitting element, i.e. in the case of parallel side faces 4b, 4c the distance between them, in the case of non-parallel side faces the distance of the side faces from one another in the z-direction at the narrowest point, is at least 20%, in particular at least 30% or 40% or 50% of the expansion E of the extension fitting element in the t-direction (likewise measured at the narrowest point).

Figure 3:
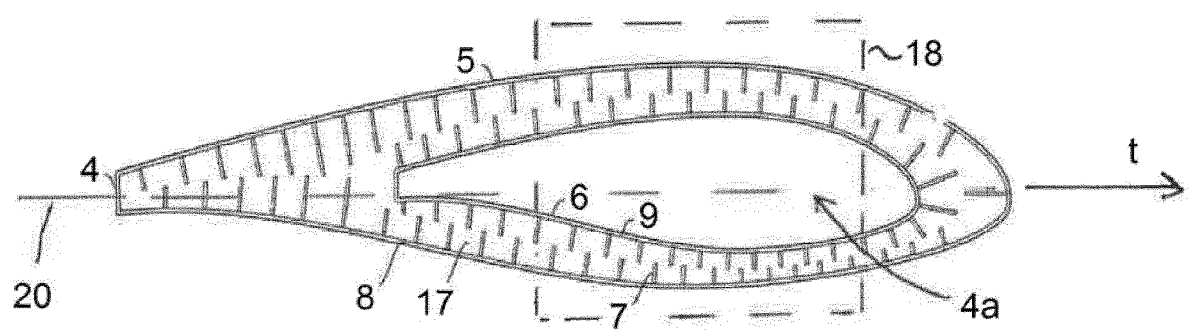
FIG. 3 shows a cross-sectional illustration of an extension fitting element perpendicularly to the z-direction.

FIG. 3 shows a cross-section through an extension fitting element 4, wherein the viewing direction lies in the z-direction of the coordinate system. In the figure, a coating 8 of the extension fitting element with a solid material, for example a resin material, is shown on the outer circumferential surface 5 and may also be fiber-reinforced. The fiber reinforcement may be uniaxial or multiaxial. The inner circumferential surface 6 of the extension fitting element 4 may also be provided, for example, with a coating 9, for example formed from a resin material, which likewise may be fiber-reinforced uniaxially or multiaxially.

In FIG. 3, slits 7 are additionally shown, wherein in particular in the load-bearing region of the extended rotor blade, which is illustrated by a dashed rectangle 18, a plurality of slits distributed equidistantly in parallel with one another is shown, and wherein a first group of slits extends into the core and the lightweight construction material of the extension fitting element, perpendicularly to the core, starting from the inner circumferential surface 6, and wherein a second group of slits, likewise arranged equidistantly from one another, extends into the core of the extension fitting element, perpendicularly thereto, starting from the outer circumferential surface 5. The slits 7 are infused with a resin material, which may also be reinforced by fibers. Due to such an arrangement of the reinforcement elements created by the infusion, a particularly good strength and stiffness of the extension fitting element is achieved in the load-bearing regions. Corresponding infused slits may also be provided in the regions which are not primarily load-bearing regions. Since the slits open out as recesses in the core at the surface of the core/extension fitting element, they may be filled, for example during the course of the coating and application of a coating 8, 9, which may contain an infusion material, in particular they may be filled also with the same infusion material that is used for the coating. A good cohesion of the fillings in the recesses, which form reinforcement regions, with the coating is thus provided.

The slits which extend into the core of the extension fitting element 4 from the outer circumferential surface 5 and the slits which extend into the core from the inner circumferential surface 6 of the extension fitting element may be offset from one another along the circumferential surfaces, in particular in each instance by half the distance provided between adjacent slits.

Figure 4:
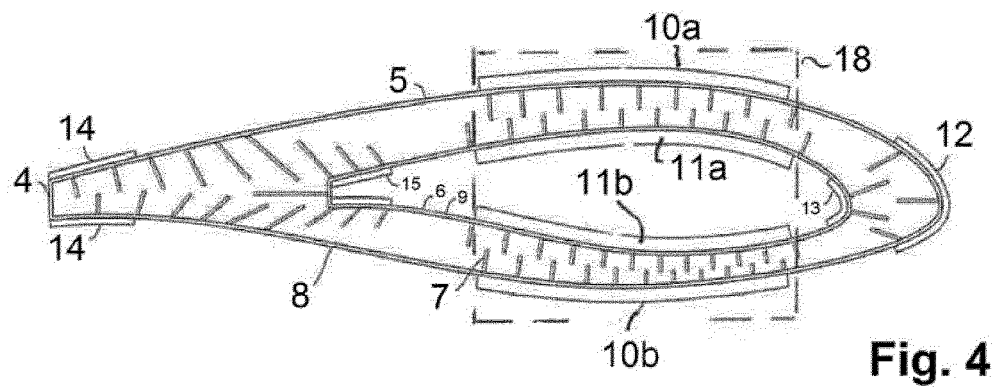
FIG. 4 shows a further cross-sectional illustration of an extension fitting element with a different arrangement of the reinforcement elements.
Figure 5:
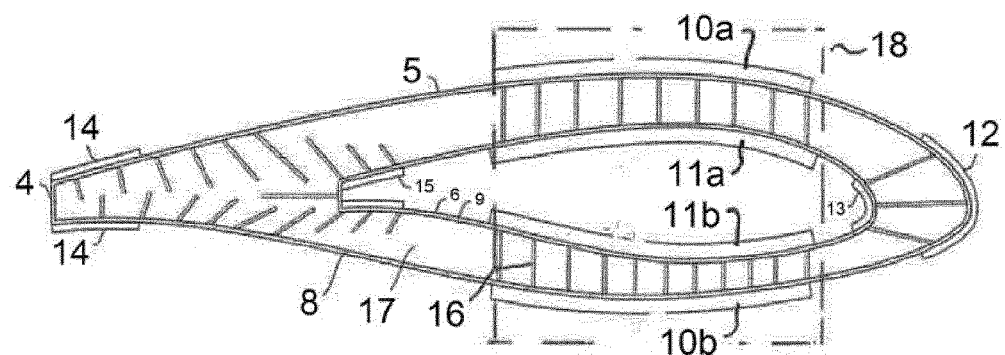
FIG. 5 shows a further illustration of an extension element with a further arrangement of reinforcement elements.

In the region of the front and rear profile edge, there may also be provided recesses/slits which extend substantially perpendicularly on the inner or outer circumferential surface of the extension fitting element in this region. For the sake of clarity, the main flanges 10a, 10b of the rotor blade extension and also the main flanges 11a, 11b of the original rotor blade to be extended are shown in FIGS. 4 and 5 on the extension fitting element 4 in the position that they assume relative to the extension fitting element following installation of the rotor blade extension. In addition, a front edge flange 12 of the rotor blade extension and also a front edge flange 13 of the rotor blade to be extended and a rear edge flange 14 of the rotor blade extension and also a rear edge flange 15 of the rotor blade to be extended are shown.

By way of example, slits are shown in FIG. 5 in the lightweight construction material 17 of the extension fitting element 4, at least some of which may also penetrate through the entire extension fitting element in some sections and may be filled with resin for stabilization. However, it is also possible, instead of the slits, to provide a multiplicity of boreholes, which extend parallel to one another in groups and together form a group of recesses which have the contour of a slit, wherein the slit thus formed is broken open.

Figure 6:
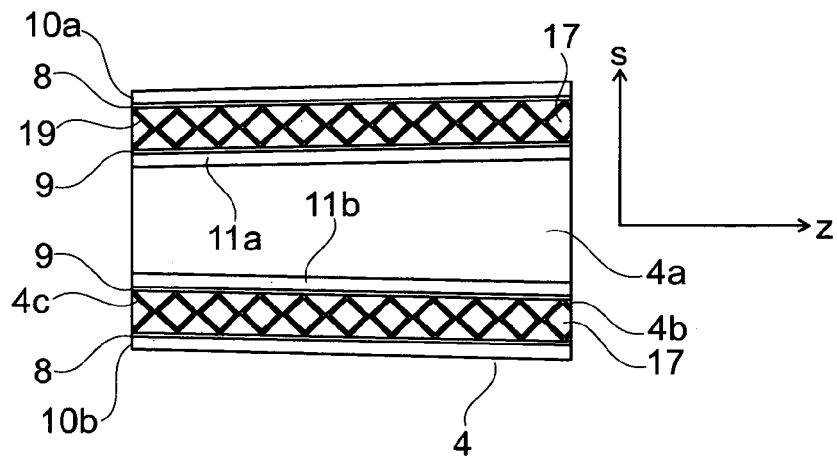
FIG. 6 shows a cross-sectional illustration of an extension fitting element perpendicularly to the t-plane, wherein boreholes which are filled with an infusion material are provided for reinforcement.

This structure is shown in more detail in FIG. 6 in a different cross section, which is considered from the axial direction t. In the figure, the extension fitting element 4 is shown with main flanges 10a, 10b of the rotor blade extension and also main flanges 11a, 11b of the original rotor blade. Boreholes 19 are formed in the core region of the extension fitting element, which is produced from the lightweight construction material 17, and extend at an angle of 45 degrees from the outer and inner circumferential surfaces 5, 6 of the extension fitting element and in a plane that lies parallel to the z-direction of the rotor blade. In this case, a first group of boreholes is inclined in a first direction by 45 degrees relative to a circumferential surface of the extension fitting element, and another group of boreholes is inclined by 45 degrees in the opposite direction, so that the boreholes of the various groups cross one another and penetrate through one another. In the shown example, the core region of the extension fitting element form a through-opening within the drawing plane, whose enveloping contour has the form of a continuous slot. Since the boreholes penetrate one another, they may advantageously be infused jointly, so that a cohesive reinforcement lattice is produced.

Figure 7:
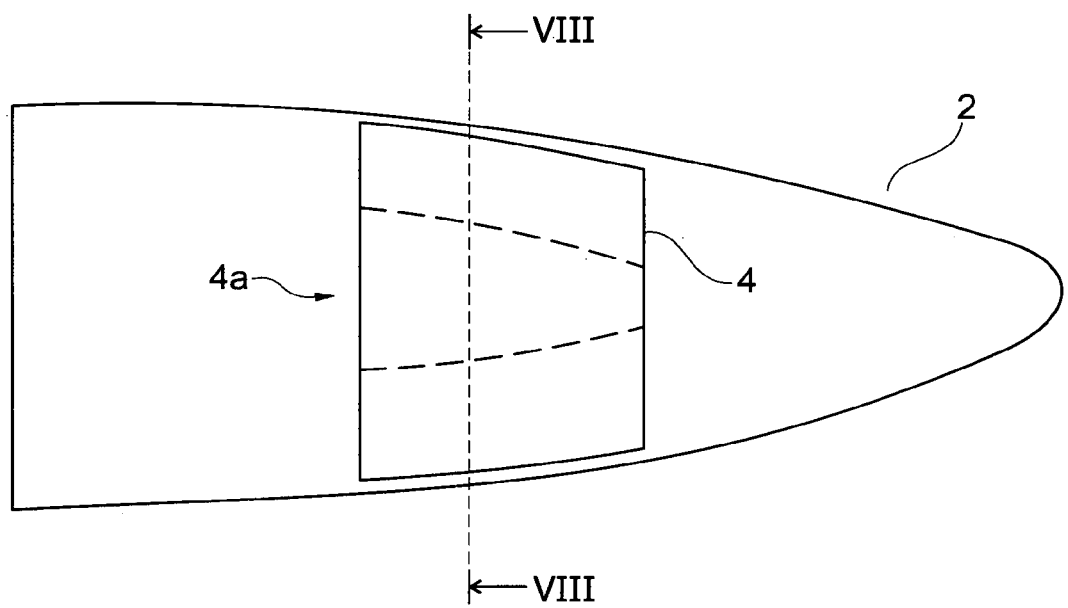
FIG. 7 shows an illustration of a rotor blade extension with an integrated extension fitting element.
Figure 8:
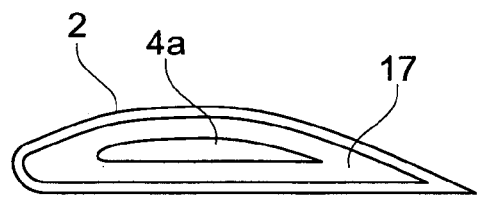
FIG. 8 shows a view of the element from FIG. 7 from the direction denoted in FIG. 7 by VIII.

FIGS. 7 and 8 show a structural integration of an extension fitting element 4 in a rotor blade extension 2. The number and arrangement of the slits within the extension fitting element may be provided in this variant in a manner similar to that shown with reference to FIGS. 3 to 6.

The component shown in FIG. 7 may be prefabricated at the factory, so that this part including the extension fitting element 4 inside the rotor blade extension 2 may be pushed onto the rotor blade tip of the rotor blade 1 to be extended and may be adhesively bonded there.

The connection between the core region of the extension fitting element 4 and the rotor blade extension 2, in particular the outer skin of the rotor blade extension 2, may be realized for example in that the lightweight construction material 17 from which the core of the extension fitting element 4 consists is introduced directly into the outer skin of the rotor blade extension 2, i.e. for example is foamed in or glued in. The assembly effort on site when attaching an extension to the rotor blades to be extended is hereby reduced.

FIG. 8 shows a cross section of the rotor blade extension 2 with the extension fitting element 4 in the direction VII as shown in FIG. 7.

Figure 9:
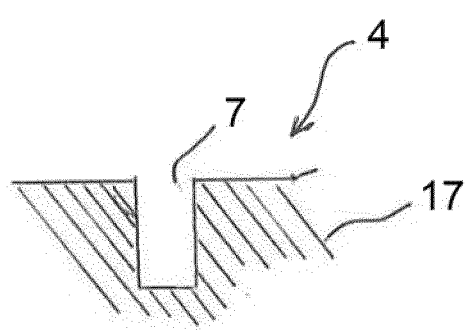
FIGS. 9, 10, and 11 show a detailed view of a surface portion of an extension fitting element in cross-section with a slit in various stages of the production process.
Figure 10:
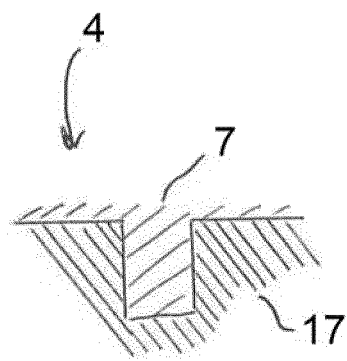
Figure 11:
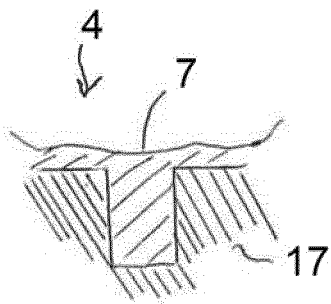

A detail of the core material of an extension fitting element 4 is shown in each of FIGS. 9, 10 and 11, wherein in FIG. 9 the starting state once one or more slits 7 have been made in the core material is shown.

In FIG. 10 it is shown that a coating 8 made of an infusion material has been applied to the surface of the extension fitting element 4 and at the same time has been introduced into the slits 7. In FIG. 11 it is additionally shown that one or more fiber layer(s)/laid scrim layer(s) may also be applied in or on the infusion material as reinforcement. The coating 8 and the filling of the slits/recesses may cure jointly.

Figure 12:
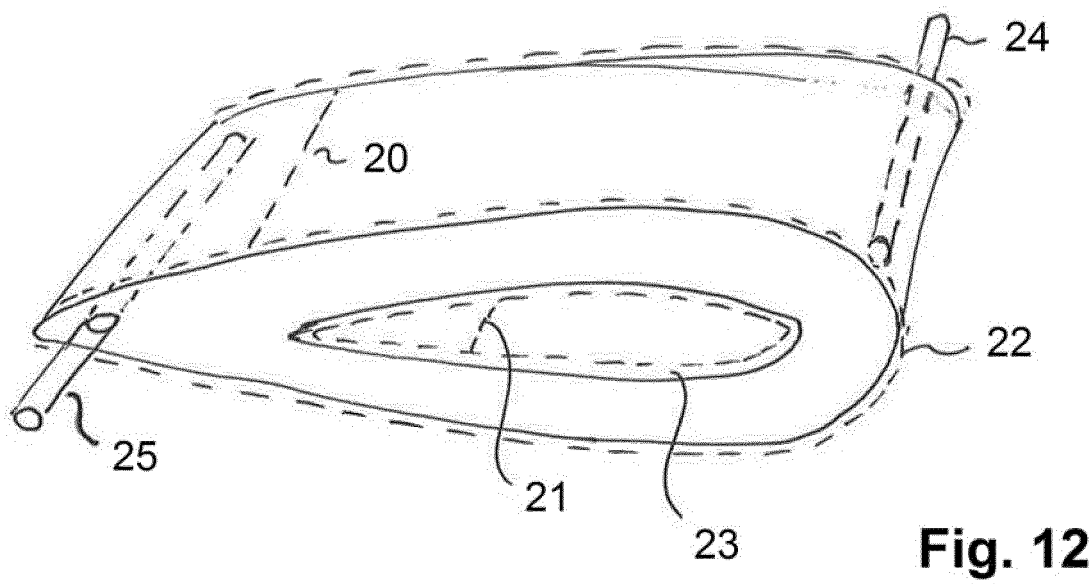
FIG. 12 shows a perspective view of an extension fitting element which is packed in a vacuum film for infusion.

In FIG. 12 the possible structure and also the approach for vacuum infusion are shown. The outer and inner circumferential surface of the rib/the extension fitting element are covered in each instance with vacuum film and, at the ends thereof, as indicated by the dashed lines 20, 21, is connected with two layers of a vacuum-tight adhesive tape, in particular what is known as Tacky Tape, both at the outer and inner circumferential surface to form a tube in each case. At the end faces for both sides of the extension fitting element, vacuum film is trimmed in accordance with the inner and outer contour and is connected in a vacuum-tight manner along the dashed lines 22, 23 to the film tubes of the outer and inner circumferential surface via a vacuum-tight adhesive tape, in particular Tacky Tape. The extension fitting element is thus completely surrounded in a vacuum-tight manner by a vacuum film. A line 24 for extracting air may penetrate through the vacuum film at a profile edge, in particular the front profile edge. A vacuum line may be arranged on the extension fitting element along the profile edge.

At the opposite profile edge, that is to say in the present example the rear profile edge, a sprue line 25 may be provided for introducing the resin, which line is guided out from the film in a vacuum-tight manner. Once the vacuum has been applied, the film adapts to the contour of the rib and closely reproduces the shapte of the infusion of the resin flowing in.

The invention claimed is:

1. An extension fitting element for a rotor blade of a wind turbine, which extension fitting element is configured as a rotor blade rib with a recess and which can be pushed onto a rotor blade tip of a rotor blade to be extended, in such a way that the rotor blade tip protrudes through the recess and contacts a circumferential surface of the recess in a positive-locking manner, wherein the extension fitting element has, on its outer circumference, an outer circumferential surface onto which a rotor blade extension can be pushed in a positive-locking manner, wherein the extension fitting element has a core made of a lightweight construction material, and has, on the outer circumferential surface and/or on an inner circumferential surface, a coating made of a fiber-reinforced layered composite material comprising a composite of matrix material and reinforcement fibers, and wherein the core of the extension fitting element has recesses, which are filled with a material that has a higher strength and/or rigidity than the material of the core.

2. The extension fitting of claim 1, wherein the core is made of a foam or balsa wood.

3. The extension fitting of claim 1, wherein the recesses are slits and/or boreholes.

4. The extension fitting element according to claim 3, wherein the recesses, in the form of slits and/or boreholes, in a region which lies between flanges of the rotor blade in the event of use on a rotor blade to be extended, extend with their slit planes and/or longitudinal borehole axes transversely.

5. The extension fitting element according to claim 3, wherein the slits and boreholes, in the extension fitting element are positioned in such a way that, once the extension fitting element and the rotor blade extension have been installed, at least some of the slits and/or boreholes, are arranged in a region of load-bearing regions of a profile of the rotor blade to be extended between flanges of the rotor blade to be extended.

6. The extension fitting element according to claim 1, wherein an expansion of the extension fitting element in a direction of a longitudinal axis of the rotor blade is at least 20% of a greatest expansion of the extension fitting element in a pivot direction (t-direction) of the rotor blade.

7. The extension fitting element according to claim 1, wherein the recesses of the core are in the form of boreholes, a borehole longitudinal axes of which extend perpendicularly or at an angle between 90 and 45 degrees to the outer circumferential surface of the extension fitting element in a plane perpendicular to a chord of the extension fitting element and which are filled with a material that has a higher strength and/or stiffness than the material of the core.

8. The extension fitting element according to claim 1, wherein the recesses of the core comprise a plurality of boreholes of which a borehole longitudinal axes extend in a plane perpendicular to a chord of the extension fitting element and which in pairs enclose an angle of between 30 and 150 degrees, to one another and are filled with a material that has a greater strength and/or stiffness than the material of the core.

9. The extension fitting element according to claim 1, wherein at least some of the slits and/or boreholes, are arranged in load-bearing regions of the extension fitting element and in each instance extend as far as the coating on the outer or inner circumferential surface of the extension fitting element.

10. An extended rotor blade for a wind turbine with an original rotor blade and the extension fitting element according to claim 1 pushed onto said rotor blade, further comprising a rotor blade extension pushed onto the extension fitting element.

11. An extended rotor blade for a wind turbine with an original rotor blade and the extension fitting element according to claim 1 pushed onto said rotor blade, wherein the extension fitting element is connected to a rotor blade extension in such a way that the extension fitting element forms an integral part of the rotor blade extension.

12. An extended rotor blade for a wind turbine with a rotor blade to be extended and the extension fitting element according to claim 1 pushed onto said rotor blade, wherein the extension fitting element is connected to a rotor blade extension in such a way that the coating formed from the fiber-reinforced layered composite material on the outer circumferential surface of the extension fitting element forms a layer of the rotor blade extension.

13. A method for producing an extension fitting element for a rotor blade of a wind turbine, which extension fitting element is formed as a rotor blade rib with a recess and which can be pushed onto a rotor blade tip of a rotor blade to be extended, in such a way that the rotor blade tip protrudes through the recess and contacts a circumferential surface of the recess in a positive-locking manner, wherein the extension fitting element has, on its outer circumference, an outer circumferential surface onto which a rotor blade extension can be pushed in a positive-locking manner, wherein a core of the extension fitting element is firstly formed from a lightweight construction material, and in that then, starting from an inner and/or outer circumferential surface of the core, slits or boreholes are formed in the core, wherein slit planes extend transversely to a chord of the extension fitting element or borehole longitudinal axes extend in the direction of the slit planes thus defined, and in that the core is coated with a fiber-reinforced layered composite material comprising a composite of matrix material and reinforcement fibers, wherein the slits or boreholes are filled with an infusion.

14. The method according to claim 13, wherein the slits/boreholes as well as the recess and outer contour are removed using a saw, milling machine, ultrasonic cutter, or hot wire.

15. The method according to claim 13, wherein slits/boreholes, in an individual step or jointly with the reinforcement fibers of the coating, are infused using a vacuum assisted resin transfer molding (VARTM) method with an infusion material, including the matrix material.

16. The method according to claim 13, wherein the core of the extension fitting element is formed either from a block of a lightweight construction material by material removal or by foaming into a mold or by an additive production method.

17. The method according to claim 16, wherein the core of the extension fitting element is formed by an additive production method, wherein the slits and/or boreholes are left void during the additive production method or are produced directly by replacing an application head with another material.

* * * * *